March 11, 1930.  E. SANDERS  1,750,362
POTATO HARVESTER
Filed May 19, 1928   3 Sheets-Sheet 1
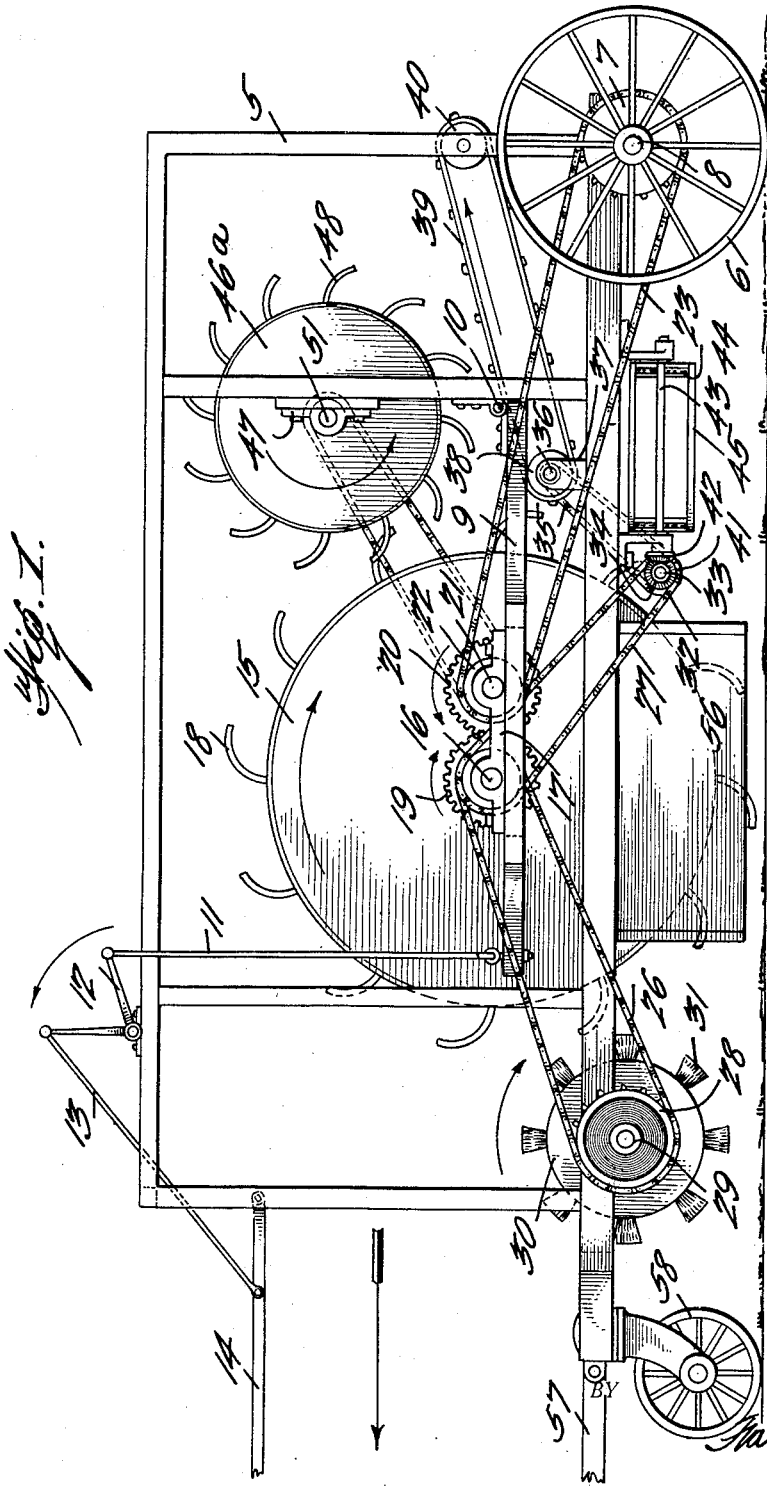
INVENTOR.
Edward Sanders,
BY
ATTORNEY.

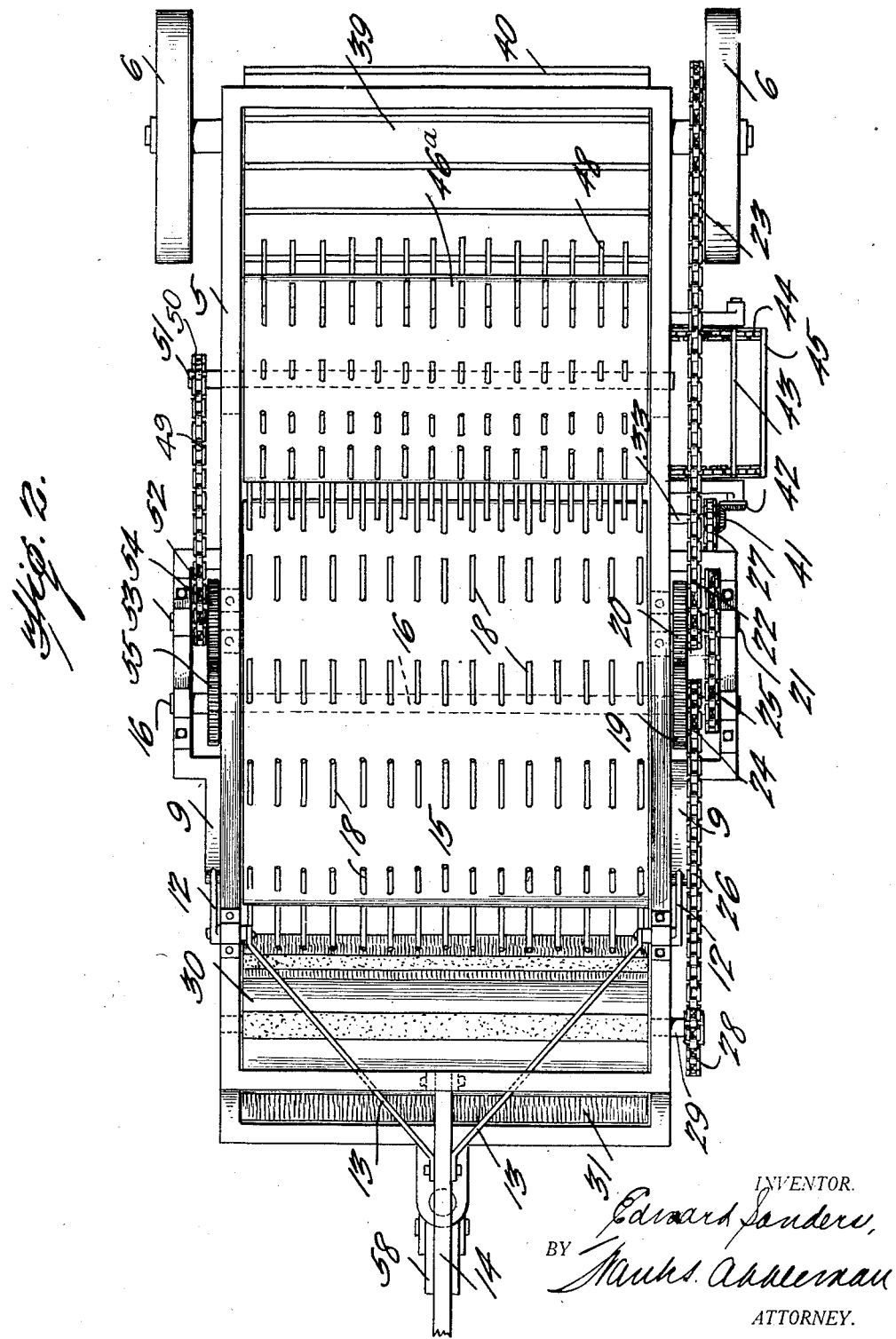

March 11, 1930. E. SANDERS 1,750,362
POTATO HARVESTER
Filed May 19, 1928 3 Sheets-Sheet 3
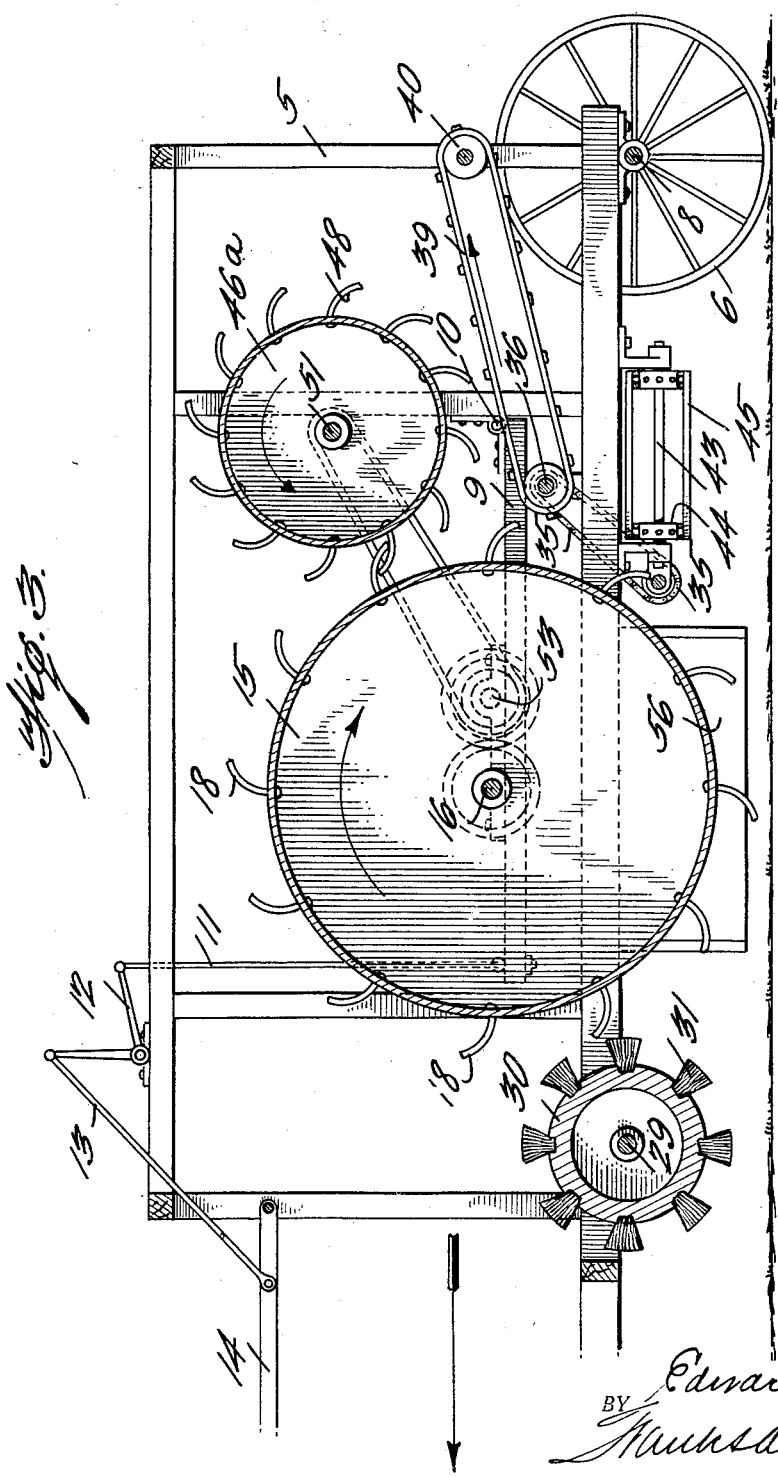
INVENTOR.
Edward Sanders,
BY
ATTORNEY.

Patented Mar. 11, 1930

1,750,362

UNITED STATES PATENT OFFICE

EDWARD SANDERS, OF MOORHEAD, MINNESOTA

POTATO HARVESTER

Application filed May 19, 1928. Serial No. 279,067.

This invention relates to potato harvesters, and has for an object the provision of a harvester which will gather potatoes and separate them from the soil while a certain amount of the soil with the potatoes is being elevated and treated.

It is a further object of this invention to provide novel means for preventing the potatoes from escaping from the said separating means until they have been delivered to properly positioned conveyers or transferring devices by which the said potatoes are discharged from the harvester.

It is a still further object of this invention to provide novel means associated with the potato dislodger and elevator which will serve to prevent the escape of the potatoes laterally of the harvester while the harvester is in the act of picking them up and elevating them.

It is furthermore an object of this invention to provide novel means whereby the harvester may be adjusted to operate at different depths with regard to the surface of the soil being worked, and furthermore to provide novel means for maintaining the picking or elevating device in an efficient operative state.

It is a still further object of the invention to produce a potato harvester embodying improvements on applicant's Patent No. 1,571,344, dated February 2, 1926.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a view in elevation of a potato harvester embodying the invention;

Figure 2 illustrates a top plan view thereof; and

Figure 3 illustrates a longitudinal sectional view.

In the present embodiment of the invention, a suitable frame 5 may be provided with traction wheels 6 of appropriate type, but as the particular mechanical features of the traction wheels do not form a part of the invention, they are but conventionally shown. A sprocket wheel 7 is arranged to take motion from the traction wheel and this, of course, can be accomplished by employing the sprocket wheel as stationary with relation to the traction wheel, or it can be secured to the axle 8, if the axle is rotated with the traction wheel.

The frame 5 includes horizontally and vertically disposed elements which may be secured together in appropriate way and arms 9 are provided with hinges 10 on the members of the frame for permitting the said arms to be adjusted vertically, that is to say, the arms will oscillate on the hinges so that the ends remote from the hinges may be elevated and lowered. As a means for affording an adjustment of the arms, their ends remote from the hinges are provided with links 11 connected to arms or bell crank levers 12 and the bell crank levers may be manipulated through the employment of the links 13 and a handle 14 for raising and lowering the said arms.

A drum or cylinder 15 having enclosed ends and an interrupted peripheral plate has trunnions, such as 16, rotatably mounted in bearings, such as 17, located on the arms and the said drum is provided preferably with curved excavating and carrrying teeth 18 which serve to dislodge potatoes and carry them upwardly and rearwardly of the harvester. A gear wheel 19 is fixed on the trunnion or shaft 16 and it meshes with a gear wheel 20 on a shaft 21. A sprocket wheel 22 on the shaft 21 is engaged by a sprocket chain 23 which operates over the sprocket wheel 7 for the purpose of driving the gear wheels 20 and 19 and, by this means, the drum 15 is rotated.

The shaft 16 is provided with sprocket wheels 24 and 25 engaged by sprocket chains 26 and 27, respectively, the former of which extends forwardly and engages a sprocket wheel 28 on a shaft 29, which shaft 29 carries a brush 30 whose brush elements 31 project into the zone of travel of the teeth of the drum, and the said brush elements serve to engage clods and dislodge them from the spaces between the teeth 18.

The sprocket chain 27 operates over a sprocket wheel 32 for driving a shaft 33, and the said shaft 33 has another sprocket wheel 34 engaged by a sprocket chain 35 which drives a shaft 36 through the medium of the sprocket wheel 37. The shaft 35 is provided with a drum or other element 38 for driving a flexible conveyer 39 that operates over an idler 40 for conveying vegetation, such as potato vines or grass rearwardly where they are discharged from the harvester.

A gear wheel 41 on the shaft 33 drives a gear wheel 42 on the shaft 43 and the shaft 43 has a drum or element 44 operating a flexible conveyer 45 which extends transversely of the harvester and it is intended to discharge the potatoes to the side of the harvester, it being understood that the potatoes dislodged from the cylinder will find their way through the slats of the conveyer 39 and descend to the conveyer 45.

A cylinder 46$^a$ is rotatably mounted in bearings, such as 47, on the frame and this cylinder has curved teeth 48 which serve to dislodge potatoes and vegetation carried by the teeth 18 of the drum 15. The drum 46$^a$ is rotated through the employment of a sprocket chain 49 operating over a sprocket wheel 50 on the shaft 51 of the drum 46$^a$ and over a sprocket wheel 52 on a shaft 53 which is driven through a gear wheel 54 and the gear wheel 55, the latter of which is on the shaft 16. As the drum 15 rotates and the teeth thereof disturb the soil, there is a tendency for the soil to move laterally and some of it moves clear of the zone of action of the said teeth. Provision is made for restricting the lateral movement of the soil and confining it in the zone of action of the teeth through the employment of the depending plates or guards 56, one of which is located at each side of the frame.

Suitable draft rigging, conventionally shown at 57, may be employed and a guide or caster wheel 58 may be mounted at the front of the frame for supporting the same.

I claim:

1. In a potato harvester, a frame, arms oscillatably mounted on the frame and extending approximately horizontally, bearings on the said arms, a drum rotatably mounted on the bearings, guards at the ends of the drum for confining soil in the effective zone of operation of the drum, means for moving the arms upwardly and downwardly, means for rotating the drum, teeth carried by the drum, means for dislodging clods from the teeth, means for dislodging vegetation from the teeth, a conveyer for the vegetation, a conveyer thereunder for receiving potatoes, and means for operating said movable parts.

2. In a potato harvester, a frame, arms on the frame and extending approximately horizontally, a drum rotatably mounted on the arms, teeth on the periphery of the drum, guards at the ends of the drum for confining soil and vegetation within the effective zone of action of the teeth, means for dislodging clods from the teeth, means for dislodging vegetation from the teeth, a conveyer for the vegetation, a conveyer thereunder for receiving potatoes, and means for operating said movable parts.

3. In a potato harvester, a frame, arms on the frame and extending approximately horizontally, a drum having enclosed ends and an uninterrupted peripheral plate, teeth carried by the peripheral plate, guards at the ends of the drum for confining soil and vegetation within the effective zone of action of the teeth, means for dislodging clods from the teeth, means for dislodging vegetation from the teeth, a conveyer for the vegetation, a conveyer thereunder for receiving potatoes, and means for operating said movable parts.

EDWARD SANDERS.